(12) United States Patent
Sun et al.

(10) Patent No.: US 9,148,596 B1
(45) Date of Patent: Sep. 29, 2015

(54) FEED-FORWARD TECHNIQUE FOR POWER SUPPLY REJECTION RATIO IMPROVEMENT OF BIT LINE

(71) Applicant: OMNIVISION TECHNOLOGIES, INC., Santa Clara, CA (US)

(72) Inventors: Tianjia Sun, Santa Clara, CA (US); Rui Wang, San Jose, CA (US); Liping Deng, Cupertino, CA (US); Tiejun Dai, Santa Clara, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 45 days.

(21) Appl. No.: 14/247,855

(22) Filed: Apr. 8, 2014

(51) Int. Cl.
*H04N 5/369* (2011.01)
*H04N 5/357* (2011.01)

(52) U.S. Cl.
CPC .............. *H04N 5/3698* (2013.01); *H04N 5/357* (2013.01)

(58) Field of Classification Search
CPC ............................... H04N 5/3698; H04N 5/357
USPC .......................................................... 348/241
See application file for complete search history.

(56) References Cited

U.S. PATENT DOCUMENTS

2004/0233313 A1* 11/2004 Ando et al. ................... 348/308
2005/0072901 A1*  4/2005 Funakoshi et al. .......... 250/208.1
2012/0038343 A1*  2/2012 Takagi et al. ................. 323/299

* cited by examiner

*Primary Examiner* — Gevell Selby
(74) *Attorney, Agent, or Firm* — Blakely Sokoloff Taylor & Zafman LLP

(57) ABSTRACT

An image sensor read out circuit includes a first current mirror circuit in which a second current conducted through a second current path is controlled in response to a first current conducted through the first current path. The second current is conducted through an amplifier transistor of a pixel circuit. A first current source is coupled to the first current path to provide a substantially constant current component of the first current. A second current source is coupled to a power supply rail of the pixel circuit and coupled to the first current path to provide a ripple current component of the first current. The ripple current component provided by the second current source is responsive to a ripple in the power supply rail. The first current is responsive to a sum of the currents from the first and second current sources.

24 Claims, 3 Drawing Sheets

FEED-FORWARD TECHNIQUE FOR POWER SUPPLY REJECTION RATIO IMPROVEMENT OF BIT LINE

BACKGROUND INFORMATION

1. Field of the Disclosure

The present invention relates generally to image sensors. More specifically, examples of the present invention are related to circuits that read out image data from image sensor pixel cells.

2. Background

Image sensors have become ubiquitous. They are widely used in digital cameras, cellular phones, security cameras, as well as, medical, automobile, and other applications. The technology used to manufacture image sensors, and in particular, complementary metal-oxide-semiconductor (CMOS) image sensors, has continued to advance at great pace. For example, the demands of higher resolution and lower power consumption have encouraged the further miniaturization and integration of CMOS image sensors.

In a conventional CMOS active pixel sensor, image charge is transferred from a photosensitive device (e.g., a photo diode) and is converted to a voltage signal inside the pixel cell on a floating diffusion node. In conventional CMOS image sensors, an amplifier such as a source follower circuit is used in the pixel cells to amplify the signal on the floating diffusion node to output the image data to the bit lines, which are read by the column read out circuitry. Limited by the design and layout constraints of pixel cells, the source follower circuits can suffer from an unsatisfactory power supply rejection ratio, such as −20 dB. An unsatisfactory power supply rejection ratio can present many challenges, including noise from power supplies that can enter into the output signal path. Furthermore, the ripple of power supplies can cause unwanted horizontal ripple in the captured image.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
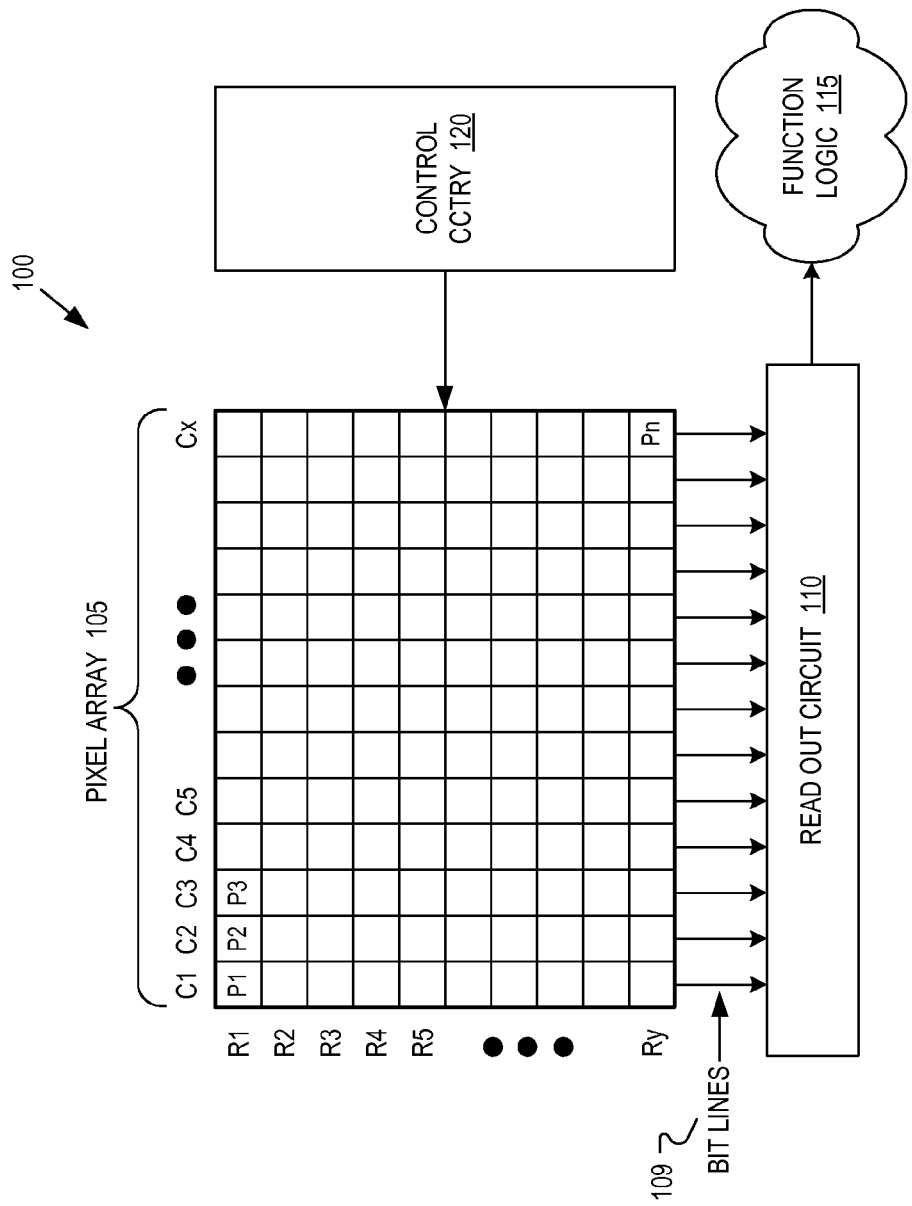
FIG. 1 is a block diagram illustrating an example imaging system including a pixel array having pixel cells and read out circuitry to improve the power supply rejection ratio in bit lines in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Examples in accordance with the teaching of the present invention describe an image sensor read out circuit that includes a current mirror circuit having a first current path and a second current path. In one example, a first current conducted through the first current path is used to control a second current in the second current path of the current mirror circuit. In one example, the second current path of the current mirror circuit is coupled to an amplifier transistor of a pixel circuit of the image sensor such that the second current is conducted through the amplifier transistor. In the example, a first current source coupled to the first current path of the first current mirror circuit is utilized to provide a substantially constant current component of the first current. A second current source coupled to a power supply rail of the pixel circuit is also coupled to the first current path of the first current mirror circuit to provide a ripple current component of the first current. In the example, the ripple current component provided by the second current source is responsive to a ripple in the power supply rail of the pixel circuit. Thus, in the example the first current is substantially equal to a sum of the substantially constant current component provided by the first current source and the ripple current component provided by the second current source in accordance with the teachings of the present invention. Since the ripple current component provided by the second current source is responsive to a ripple in the power supply rail, which may be caused for example by noise in the power supply, ripples in the current through the amplifier transistor have substantially the same phase and frequency as the noise in the power supply rail, which therefore provides an improved power supply rejection ratio in accordance with the teachings of the present invention.

To illustrate, FIG. 1 is a schematic illustrating one example of an image sensing system 100 that includes a read out circuit 110 that provides an improved power supply rejection ratio in accordance with the teachings of the present invention. As shown in the depicted example, imaging system 100 includes pixel array 105 coupled to control circuitry 120 and read out circuit 110, which is coupled to function logic 115.

In one example, pixel array 105 is a two-dimensional (2D) array of imaging sensors or pixel cells (e.g., pixel cells P1, P2 . . . , Pn). In one example, each pixel cell is a CMOS imaging pixel. As illustrated, each pixel cell is arranged into a row (e.g., rows R1 to Ry) and a column (e.g., column C1 to Cx) to acquire image data of a person, place, object, etc., which can then be used to render a 2D image of the person, place, object, etc.

In one example, after each pixel cell has accumulated its image data or image charge, the image data is read out by read out circuit 110 through column bit lines 109 and then transferred to function logic 115. In various examples, read out circuit 110 may also include additional amplification circuitry, additional analog-to-digital (ADC) conversion circuitry, or otherwise. Function logic 115 may simply store the image data or even manipulate the image data by applying post image effects (e.g., crop, rotate, remove red eye, adjust brightness, adjust contrast, or otherwise). In one example, read out circuit 110 may readout a row of image data at a time along readout column bit lines 109 (illustrated) or may read out the image data using a variety of other techniques (not illustrated), such as a serial readout or a full parallel readout of all pixels simultaneously.

In one example, control circuitry 120 is coupled to pixel array 105 to control operational characteristics of pixel array 105. For example, control circuitry 120 may generate a shutter signal for controlling image acquisition. In one example, the shutter signal is a global shutter signal for simultaneously enabling all pixels within pixel array 105 to simultaneously capture their respective image data during a single acquisition window. In another example, the shutter signal is a rolling shutter signal such that each row, column, or group of pixels is sequentially enabled during consecutive acquisition windows.

Figure 2:
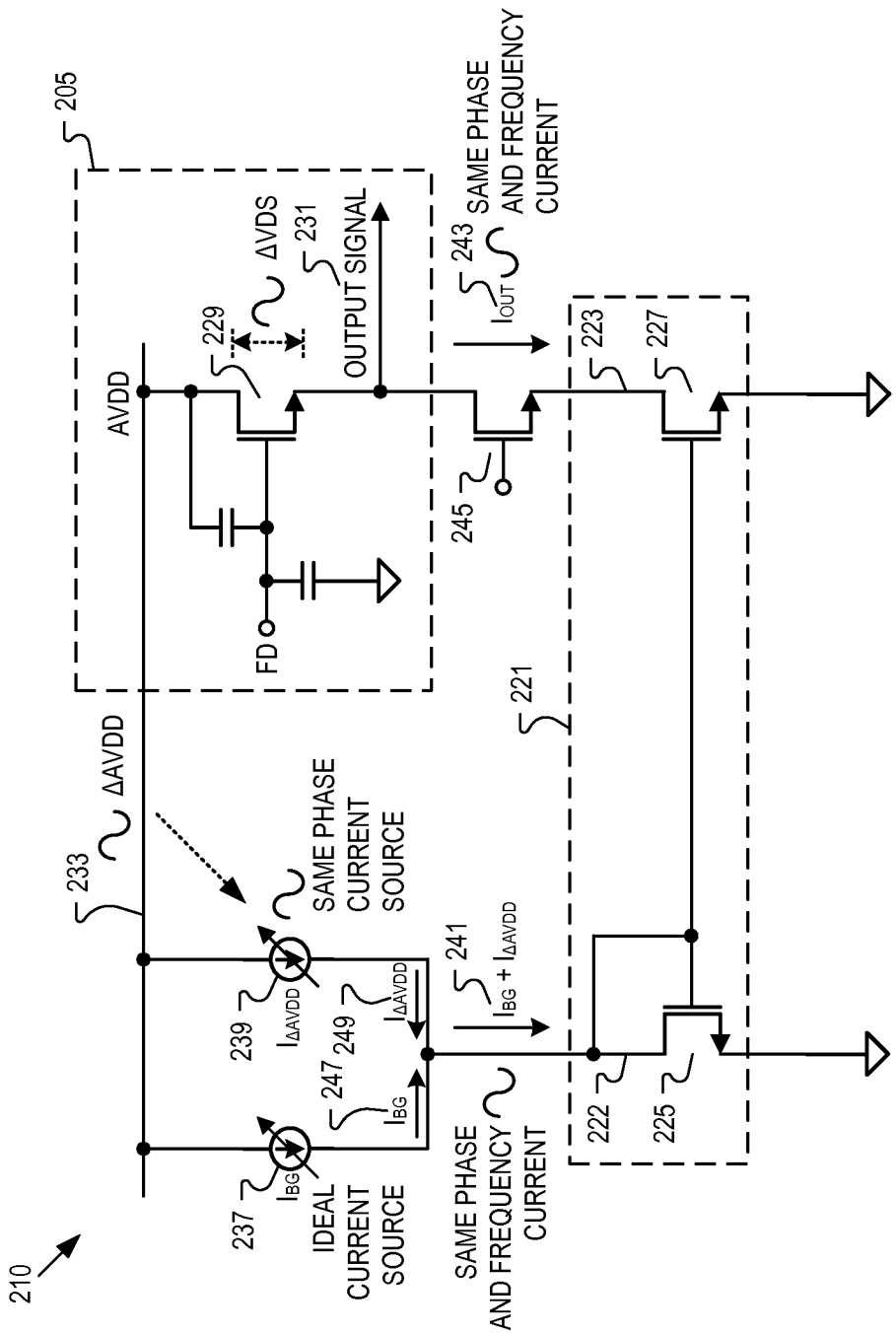
FIG. 2 is a schematic illustrating one example of read out circuitry of an image sensing system that improves the power supply rejection ratio in bit lines in accordance with the teachings of the present invention.

FIG. 2 is a schematic illustrating one example of a read out circuit 210 of an image sensing system that improves the power supply rejection ratio in bit lines in accordance with the teachings of the present invention. In one example, it is appreciated that read out circuit 210 of FIG. 2 may be one example of read out circuit 110 of FIG. 1, and that similarly named and numbered elements referenced below may be coupled and function similar to as described above. As shown in the example depicted in FIG. 2, read out circuit 210 includes a current mirror circuit 221 having a first current path 222 and a second current path 223. Current mirror circuit 221 includes a transistor 225 and a transistor 227, each having their respective control terminals coupled together as shown. In the illustrated example, transistors 225 and 227 are MOSFETs with their gate terminals coupled together. As shown in the example, the gate terminal of transistor 225 is also coupled to the drain terminal of transistor 225. In the example, the first current path 222 is coupled to transistor 225 and the second current path 223 is coupled to transistor 227 as shown. In the example, a second current 243 that is conducted through the second current path 223 is controlled in response to a first current 241 that is conducted through the first current path 222 of current mirror circuit 221.

In the example depicted in FIG. 2, a portion of an example pixel circuit 205 is illustrated, which in one example may be a portion of one of the example pixel cells P1, P2 . . . , Pn of pixel array 105 of FIG. 1. As shown in the example of FIG. 2, pixel circuit 205 includes an amplifier transistor 229 coupled to a power supply rail 233, and a floating diffusion node FD. In the illustrated example, amplifier transistor 229 is a MOSFET that is coupled as a source follower to amplify a signal that is on the floating diffusion node FD of pixel circuit 205. The floating diffusion node FD is coupled to the gate terminal of transistor 229 as shown to output the image data as output signal 231 of pixel circuit 205 from the source terminal of transistor 229 to the bit lines, such as for example bit lines 109 of FIG. 1. As shown in the example depicted in FIG. 2, the drain terminal of transistor 229 is coupled to receive AVDD from power supply rail 233.

As shown in the example depicted in FIG. 2, the second current path 223 of the current mirror circuit 221 is coupled to amplifier transistor 229 of a pixel circuit 205 through a transistor 245. Accordingly, the output current $I_{OUT}$ that is conducted through amplifier transistor 229 is also the second current 243 that is conducted through the second current path 223, which is controlled in response to a first current 241 that is conducted through the first current path 222 of current mirror circuit 221 in accordance with the teachings of the present invention.

In the example depicted in FIG. 2, the first current path 222 is coupled to receive a first current $I_{BG}$ 247 from a first current source 237, and a second current $I_{\Delta AVDD}$ 249 from a second current source 239 such that the first current 241 that is conducted through the first current path 222 of current mirror circuit 221 is substantially equal to the sum of first current $I_{BG}$ 247 and second current $I_{\Delta AVDD}$ 249. In one example, first current source 237 is an adjustable ideal bandgap bias current source that provides a substantially constant current component of the first current 241 that does not change with the noise and ripple in the AVDD power supply rail 233. In the example, first current source 237 provides the substantially constant current once the trimming has been completed. In the example, second current source 239 is an adjustable bias current source that is coupled to power supply rail 233 to provide a ripple current component of the first current 241 that is responsive to ripple $\Delta AVDD$ that occurs in the power supply rail 233. In the example, second current source 239 is an adjustable bias current source that changes with the AVDD power supply rail 233 in the same phase and frequency.

As mentioned, both first current source 237 and second current source 239 are adjustable in the depicted example. In one example, by adjusting the ratio of the two current sources, the second current 243 through amplifier transistor 229 can be controlled to satisfy a number of conditions. One condition is a direct current (DC) condition in which the average current 243 through the amplifier transistor 229 can be set to be substantially equal to a design value of the amplifier transistor 229, such as for example several µA. A second condition is an alternating current (AC) condition in which the current 243 through the amplifier transistor 229 can be set to produce a $\Delta VDS$ voltage drop ripple across the amplifier transistor 229 that is responsive to the phase and frequency of the $\Delta AVDD$ voltage ripple in the power supply rail 233. As such, a feedforward technique of utilizing the $\Delta AVDD$ voltage ripple in the power supply rail 233 as shown is utilized to produce a corresponding $\Delta VDS$ voltage drop ripple across the amplifier transistor 229, which compensates for the ripple and noise in the power supply, and therefore improves the power supply rejection ratio in accordance with the teachings of the present invention.

Figure 3:
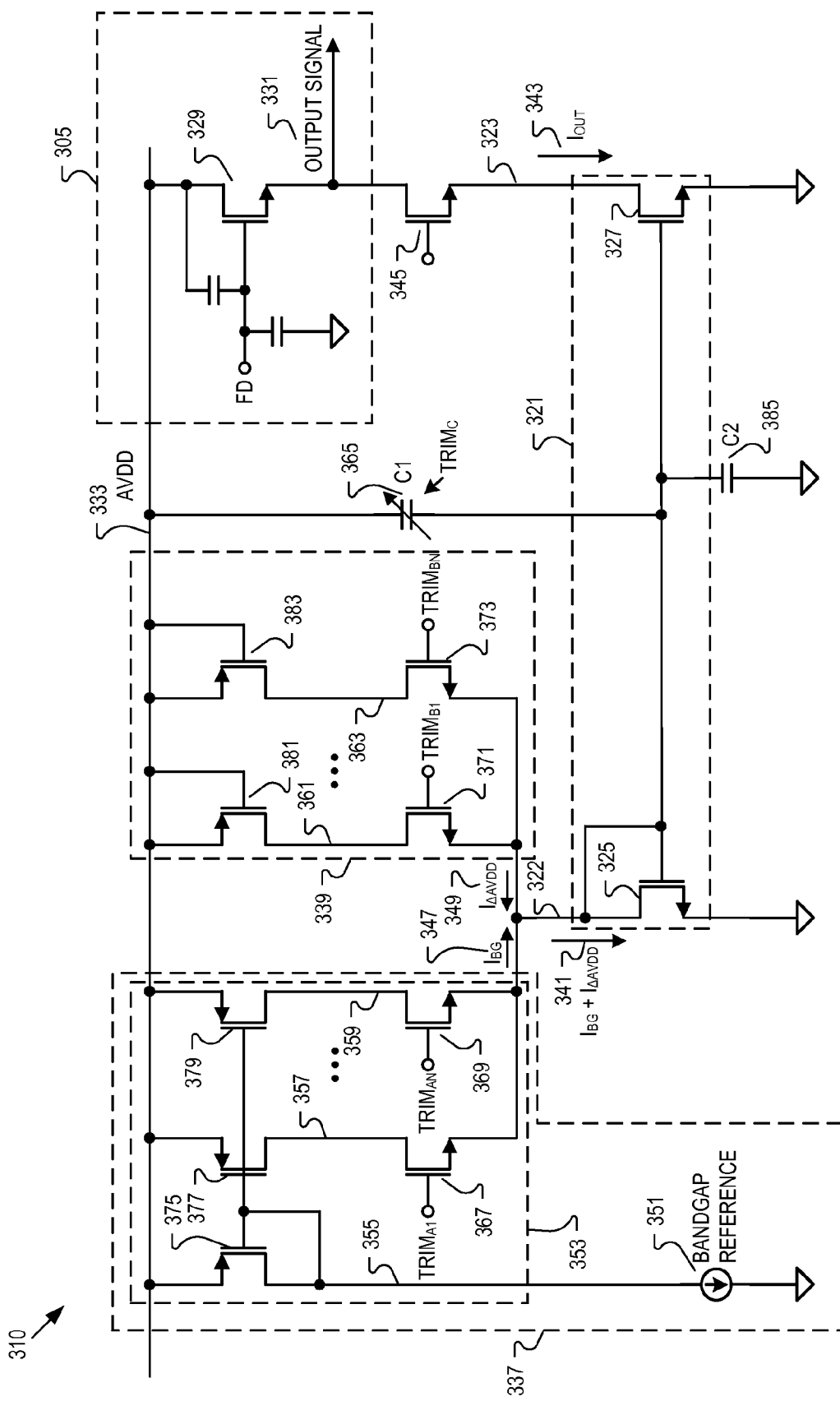
FIG. 3 is a schematic illustrating one example in greater detail of a read out circuit of an image sensing system that improves the power supply rejection ratio in bit lines in accordance with the teachings of the present invention.

FIG. 3 is a schematic illustrating one example in greater detail of a read out circuit 310 of an image sensing system that improves the power supply rejection ratio in bit lines in accordance with the teachings of the present invention. In one example, it is appreciated that read out circuit 310 of FIG. 3 may be one example of read out circuit 110 of FIG. 1 or one example of read out circuit 210 of FIG. 2, and that similarly named and numbered elements referenced below may be coupled and function similar to as described above. As shown in the example depicted in FIG. 3, read out circuit 310 includes a first current mirror circuit 321 having a first current path 322 and a second current path 323. The first current mirror circuit 321 includes a transistor 325 and a transistor 327 having their control terminals coupled together as shown. In the illustrated example, transistors 325 and 327 are MOSFETs with their gate terminals coupled together. As shown in the example, the gate terminal of transistor 325 is also coupled to the drain terminal of transistor 325. In the example, the first current path 322 is conducted through transistor 325 and the second current path 323 is conducted through transistor 327 as shown. In the example, a second current 343 that is conducted through the second current path 323 is controlled in response to a first current 341 that is conducted through the first current path 322 of the current mirror circuit 321.

In the example depicted in FIG. 3, a portion of an example pixel circuit 305 is illustrated, which in one example may be a portion of one of the example pixel cells P1, P2 . . . , Pn of pixel array 105 of FIG. 1, or one example of pixel circuit 205 of FIG. 2. Accordingly, similarly named and numbered elements referenced below may be coupled and function similar to as described above. As shown in the example of FIG. 3, pixel circuit 305 includes an amplifier transistor 329 coupled to a power supply rail 333, and a floating diffusion node FD. In the illustrated example, amplifier transistor 329 is a MOSFET that is coupled as a source follower to amplify the signal that is on the floating diffusion node FD, which is coupled to the gate terminal of transistor 329 as shown to output the image data as output signal 331 of pixel circuit 305 from the source terminal of transistor 329 to the bit lines, such as for example bit lines 109 of FIG. 1. As shown in the example depicted in FIG. 3, the drain terminal of transistor 329 is coupled to receive AVDD from power supply rail 333.

As shown in the example depicted in FIG. 3, the second current path 323 of the current mirror circuit 321 is coupled to amplifier transistor 329 of a pixel circuit 305 through a transistor 345. Accordingly, the output current $I_{OUT}$ that is conducted through amplifier transistor 329 is also the second current 343 that is conducted through the second current path 323, which is controlled in response to a first current 341 that is conducted through the first current path 322 of current mirror circuit 321 in accordance with the teachings of the present invention.

In the example depicted in FIG. 3, the first current path 322 is coupled to receive a first current $I_{BG}$ 347 from a first current source 337, and a second current $I_{\Delta AVDD}$ 349 from a second current source 339 such that the first current 341 that is conducted through the first current path 322 of current mirror circuit 321 is substantially equal to the sum of first current $I_{BG}$ 347 and second current $I_{\Delta AVDD}$ 349.

In one example, first current source 337 is an adjustable ideal bandgap bias current source that provides a substantially constant current $I_{BG}$ component of the first current 341 that does not change with the $\Delta AVDD$ ripple of power supply rail 333. In the example, first current source 337 provides the substantially constant current once the current adjustment has been completed. In the example, second current source 339 is an adjustable bias current source that is coupled to power supply rail 333 to provide a ripple current component of the first current 341 that is responsive to $\Delta AVDD$ ripple that occurs in the power supply rail 333. In the example, second current source 339 is an adjustable bias current source that changes at the same phase and frequency with the $\Delta AVDD$ ripple that occurs in power supply rail 333.

As shown in the example depicted in FIG. 3, first current source 337 includes a bandgap reference current source 351, which is an ideal bandgap bias current source that provides a substantially constant current that does not change with the $\Delta AVDD$ ripple of power supply rail 333. In the example, first current source 337 also includes a second current mirror circuit 353 having a first current path 355 coupled to the bandgap reference current source 351. In one example, second current mirror circuit 353 also includes a second current path 357 coupled to the first current path 322 of the first current mirror circuit 321. As shown in the depicted example, second current path 357 is one of a plurality of switched current paths, including second current path 357 and a third current path 359, which are coupled to the first current path 322 of first current mirror circuit 321. In the illustrated example, second current path 357 is switched using transistor 367 in response to a trim signal $TRIM_{A1}$, and third current path 359 is switched using transistor 369 in response to a trim signal $TRIM_{AN}$. In the example, the trim signals $TRIM_{A1}$ . . . $TRIM_{AN}$ may be used to adjust the substantially constant current $I_{BG}$ 347 in accordance with the teachings of the present invention.

In the depicted example, the second current mirror circuit 353 also includes a plurality of transistors, including transistor 375, transistor 377, and transistor 379, each having their respective control terminals coupled together as shown. In the illustrated example, transistors 375, 377, and 329 are MOSFETs with their gate terminals coupled together. As shown in the example, the gate terminal of transistor 375 is also coupled to the drain terminal of transistor 375. In the example, the first current path 355 of second current mirror circuit 353 is conducted through transistor 375, the second current path 357 of second current mirror circuit 353 is conducted through transistor 377, and the third current path 359 is conducted through transistor 379 as shown. In the example, the currents that are conducted through the second current path 357 and third current path 359 are controlled in response to the current through the first current path 355 of the second current mirror circuit 353.

In the example depicted in FIG. 3, second current source 339 includes a plurality of switched current paths, including current path 361 and current path 363, which are coupled to the first current path 322 of first current mirror circuit 321 to provide the ripple current component of the first current 341 that is responsive to ripple $\Delta AVDD$ that occurs in the power supply rail 333 in accordance with the teachings of the present invention. In the illustrated example, current path 361 is switched using transistor 371 in response to a trim signal $TRIM_{B1}$, and current path 363 is switched using transistor 373 in response to a trim signal $TRIM_{BN}$. In the example, the trim signals $TRIM_{B1}$ . . . $TRIM_{BN}$ may be used to adjust the ripple current component $I_{\Delta AVDD}$ 349 in accordance with the teachings of the present invention.

In the depicted example, second current source 339 also includes a plurality of transistors, including transistor 381 and transistor 383 each having their respective control terminals coupled to the power supply rail 333 as shown. In the illustrated example, transistors 381 and 383 are self-biased MOSFETs with their gate terminals coupled to their source terminals as well as to power supply rail 333 as shown. With their respective gate terminals coupled as shown in FIG. 3, the respective currents conducted through transistors 381 and 383 are responsive to the power supply rail 333 and therefore have the same phase and frequency of the $\Delta AVDD$ ripple that occurs in the power supply rail 333 in accordance with the teachings of the present invention. With the switched current paths provided with transistors 371 and 373 discussed above, the currents provided by transistors 381 and 383 provided digital bias sources that are digitally adjustable.

By utilizing the trim signals $TRIM_{A1} \ldots TRIM_{AN}$ to adjust the first current source 337, and utilizing the trim signals $TRIM_{B1} \ldots TRIM_{BN}$ to adjust the second current source 339, an optimized ratio between the first current source 337 and second source 339 can obtained to provide an optimized ratio of the two current sources 337 and 339 to meet DC and AC conditions discussed above at the same time in accordance with the teachings of the present invention.

In one example, read out circuit 310 also includes an adjustable capacitor C1 365 coupled between power supply rail 333 and the control terminal of transistor 327. Thus, as shown in the example depicted in FIG. 3, the gate terminal of transistor 327 is capacitively coupled, or AC coupled, to power supply rail 333 through adjustable capacitor C1 365. In one example, a capacitor C2 385 is also coupled between the gate terminal of transistor 327 and ground. With the capacitive or AC coupling of the gate terminal of transistor 327 to the power supply rail 333, when there is ΔAVDD ripple in the power supply rail 333, the ripple will be capacitively coupled to the gate terminal of transistor 327. As a result, the ΔAVDD ripple in the power supply rail 333 affects the second current 343 that is conducted through the second current path 323 through the amplifier transistor 329 in accordance with the teachings of the present invention. In other words, if it is assumed that transistor 327 is an output transistor and that the second current 343 conducted through transistor 327 and amplifier transistor 329 is an output current that is conducted through output current path 323, the effect of the ΔAVDD ripple in the power supply rail 333 on the second current 343 results in a corresponding ΔVDS voltage across the amplifier transistor 329 with the same phase and frequency. The corresponding ΔVDS voltage across the amplifier transistor 329 in response to the ripple in the power supply rail 333 compensates for the ripple that in power supply rail 333, which improves the power supply rejection ratio in accordance with the teachings of the present invention.

In an alternate example, it is appreciated that with adjustable capacitor C1 365 coupled between power supply rail 333 and the control gate transistor 327, the first current source 337 and second current source 339 are optional in read out circuit 310 and that the ΔAVDD ripples in the power supply rail 333 may be compensated with adjustable capacitor C1 365 to improve the power supply rejection ratio in accordance with the teachings of the present invention.

In one example, the capacitance of adjustable capacitor C1 365 may be trimmed in response to a trim signal $TRIM_C$ to tune the amount of capacitance and compensation to be provided by adjustable capacitor C1 365. In one example, adjustable capacitor C1 365 may be implemented using a variety of techniques, including for example a single adjustable metal-to-metal capacitor, or any other adjustable capacitance technique, such as for example utilizing switched metal 1 and metal 2 layers in an integrated circuit chip in accordance with the teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An image sensor read out circuit, comprising:
    a first current mirror circuit having a first current path and a second current path, wherein a second current conducted through the second current path of the first current mirror circuit is controlled in response to a first current conducted through the first current path of the first current mirror circuit, wherein the second current path of the first current mirror circuit is coupled to an amplifier transistor of a pixel circuit of an image sensor, wherein the second current is conducted through the amplifier transistor;
    a first current source coupled to the first current path of the first current mirror circuit to provide a substantially constant current component of the first current; and
    a second current source coupled to a power supply rail of the pixel circuit and coupled to the first current path of the first current mirror circuit to provide a ripple current component of the first current, wherein the ripple current component provided by the second current source is responsive to a ripple in the power supply rail, wherein the first current is responsive to a sum of the substantially constant current component provided by the first current source and the ripple current component provided by the second current source.

2. The image sensor read out circuit of claim 1 wherein the first current source comprises a bandgap reference circuit coupled to provide a substantially constant reference substantially independent of the ripple of the power supply rail.

3. The image sensor read out circuit of claim 1 wherein the first current source is adjustable.

4. The image sensor read out circuit of claim 3 wherein the first current source comprises a first plurality of switched current paths coupled to the first current path of the first current mirror circuit to adjust the substantially constant current component provided by the first current source.

5. The image sensor read out circuit of claim 1 wherein the first current source comprises a second current mirror circuit including at least a first current path and a second current path, wherein the first current path of the second current mirror circuit is coupled to a bandgap reference circuit, and wherein the second current path of the second current mirror circuit is coupled to the first current path of the first current mirror circuit.

6. The image sensor read out circuit of claim 1 wherein the second current source is adjustable.

7. The image sensor read out circuit of claim 6 wherein the second current source comprises a second plurality of switched current paths coupled to the first current path of the first current mirror circuit to adjust the ripple current component provided by the second current source.

8. The image sensor read out circuit of claim 1 wherein a control terminal of an output transistor included in the second current path of the first current mirror is capacitively coupled to the power supply rail.

9. The image sensor read out circuit of claim 1 further comprising an adjustable capacitance coupled between power supply rail and a control terminal of an output transistor included in the second current path of the first current mirror.

10. An imaging system comprising:
a pixel array including a plurality of pixel circuits, wherein each one of the pixel circuits includes an amplifier transistor coupled to generate an output signal of the pixel circuit;
control circuitry coupled to the pixel array to control operation of the pixel array; and
read out circuitry coupled to the pixel array to read out image data from the pixel array, wherein the read out circuitry includes:
a first current mirror circuit having a first current path and a second current path, wherein a second current conducted through the second current path of the first current mirror circuit is controlled in response to a first current conducted through the first current path of the first current mirror circuit, wherein the second current path of the first current mirror circuit is coupled to the amplifier transistor of a pixel circuit of an image sensor, wherein the second current is conducted through the amplifier transistor;
a first current source coupled to the first current path of the first current mirror circuit to provide a substantially constant current component of the first current; and
a second current source coupled to a power supply rail of the pixel circuit and coupled to the first current path of the first current mirror circuit to provide a ripple current component of the first current, wherein the ripple current component provided by the second current source is responsive to a ripple in the power supply rail, wherein the first current is responsive to a sum of the substantially constant current component provided by the first current source and the ripple current component provided by the second current source.

11. The imaging system of claim 10 further comprising function logic coupled to the read out circuitry to store the image data read out from the pixel array.

12. The imaging system of claim 10 wherein the first current source comprises a bandgap reference circuit coupled to provide a substantially constant reference substantially independent of the ripple of the power supply rail.

13. The imaging system of claim 10 wherein the first current source is adjustable.

14. The imaging system of claim 13 wherein the first current source comprises a first plurality of switched current paths coupled to the first current path of the first current mirror circuit to adjust the substantially constant current component provided by the first current source.

15. The imaging system of claim 10 wherein the first current source comprises a second current mirror circuit including at least a first current path and a second current path, wherein the first current path of the second current mirror circuit is coupled to a bandgap reference circuit, and wherein the second current path of the second current mirror circuit is coupled to the first current path of the first current mirror circuit.

16. The imaging system of claim 10 wherein the second current source is adjustable.

17. The imaging system of claim 16 wherein the second current source comprises a second plurality of switched current paths coupled to the first current path of the first current mirror circuit to adjust the ripple current component provided by the second current source.

18. The imaging system of claim 10 wherein a control terminal of an output transistor included in the second current path of the first current mirror is capacitively coupled to the power supply rail.

19. The imaging system of claim 10 further comprising an adjustable capacitance coupled between the power supply rail and a control terminal of an output transistor included in the second current path of the first current mirror.

20. An image sensor read out circuit, comprising:
an output transistor coupled to an output current path coupled to an amplifier transistor of a pixel circuit of the image sensor, wherein an output current through the output current path is conducted through the amplifier transistor; and
an adjustable capacitance coupled between a power supply rail and a control terminal of the output transistor such that a ripple in the power supply rail is capacitively coupled through the adjustable capacitance to the control terminal of the output transistor to affect the output current through the amplifier transistor in response to the ripple in the power supply rail.

21. The image sensor read out circuit of claim 20 wherein the amplifier transistor of a pixel circuit of the image sensor is coupled to the power supply rail.

22. The image sensor read out circuit of claim 20 further comprising a first current mirror circuit having a first current path and a second current path, wherein a second current conducted through the second current path of the first current mirror circuit is controlled in response to a first current conducted through the first current path of the first current mirror circuit, wherein the second current path is the output current path.

23. The image sensor read out circuit of claim 22 further comprising a first current source coupled to the first current path of the first current mirror circuit to provide a substantially constant current component of the first current.

24. The image sensor read out circuit of claim 23 further comprising a second current source coupled to the power supply rail of the pixel circuit and coupled to the first current path of the first current mirror circuit to provide a ripple current component of the first current, wherein the ripple current component provided by the second current source is responsive to the ripple in the power supply rail, wherein the first current is equal to a sum of the substantially constant current component provided by the first current source and the ripple current component provided by the second current source.

* * * * *